United States Patent [19]

Worden

[11] 3,941,508

[45] Mar. 2, 1976

[54] AUTOMATIC PRESSURE CONTROL SYSTEM

[75] Inventor: Donald A. Worden, Pompton Plains, N.J.

[73] Assignee: Marotta Scientific Controls, Inc., Boonton, N.J.

[22] Filed: Apr. 11, 1975

[21] Appl. No.: 567,090

[52] U.S. Cl. ................. 417/46; 417/206; 417/403; 60/428
[51] Int. Cl.² .................... F04B 49/00; F04B 23/12
[58] Field of Search ............. 417/46, 316, 403, 206; 60/428, 430

[56] References Cited
UNITED STATES PATENTS

| 660,239 | 10/1900 | Aneshaensel | 417/46 |
| 1,015,464 | 1/1912 | Wilkins | 417/46 |
| 2,881,749 | 4/1959 | Pringham | 417/206 |

*Primary Examiner*—William L. Freeh
*Assistant Examiner*—G. P. LaPointe
*Attorney, Agent, or Firm*—Hopgood, Calimafde

[57] ABSTRACT

This gas pressure control system is intended primarily for testing gauges by providing an accurate static gas pressure over a wide range, preferably from zero to 10,000 pounds per square inch. The system is equipped with a pressure intensifier that operates automatically to raise the delivery pressure above the supply pressure when necessary. The supply may be a bottle of nitrogen under pressure of two thousand two hundred pounds per square inch, and the pressure intensifier is preferably a cylinder-and-piston motor-pump combination with a displacement ratio such as 70 to 1.

16 Claims, 2 Drawing Figures

AUTOMATIC PRESSURE CONTROL SYSTEM

BACKGROUND AND SUMMARY OF THE INVENTION

The pressure control system of this invention is connected with a test port at which successive gauges are connected with the system and supplied with pressure of different values to calibrate the accuracy of the gauge.

Pressure is supplied to the system from a source of gas supply such as a bottle or high pressure storage cylinder. A flow control valve or pressure regulator receives the gas from the supply source and delivers it to the system at a controled pressure which depends upon the loading of the regulating chamber of the control valve. This loading depends on adjustable signals supplied to the control valve and such signals are preferably electric signals to solenoids that change the loading on the control valve and the resulting delivery pressure from the control valve.

For pressures in the lower part of the range of the system, the changes can be controlled from the control valve or pressure regulator that receives the gas from the supply source. For higher pressures in excess of those which the control valve can supply, there is a pressure intensifier located between the output of the first control valve and the test port to which gauges are connected.

In the preferred embodiment of the invention, the pressure intensifier includes a pump having a piston which reciprocates to permit entry of gas into the pump from the control valve. The piston then moves in the opposite direction to discharge the gas at a higher and controlled pressure to the test port. In the simplest construction of the invention, the pump piston is connected directly with a piston of a motor of substantially greater displacement than the pump so as to obtain high pump discharge pressure with relatively low pressure supply to the intensifier motor. A displacement ratio of 70 to 1 may be used, by way of example.

A second control valve, referred to as a "mode selector" valve is responsive to pressures at different part of the system and operates to determine when the intensifier becomes necessary in order to maintain desired outlet pressures to the test port.

An auxiliary supply of gas under pressure is controlled by a third control valve which supplies working fluid to the pump for the pressure intensifier and this third control valve is responsive to pressure at other parts of the system in order to make its operation automatic.

The system preferably controls pressure by using a transducer in the test port circuit to generate a feedback signal of low voltage that controls a comparator circuit that regulates the first control valve and indirectly the operation of the pressure intensifier.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
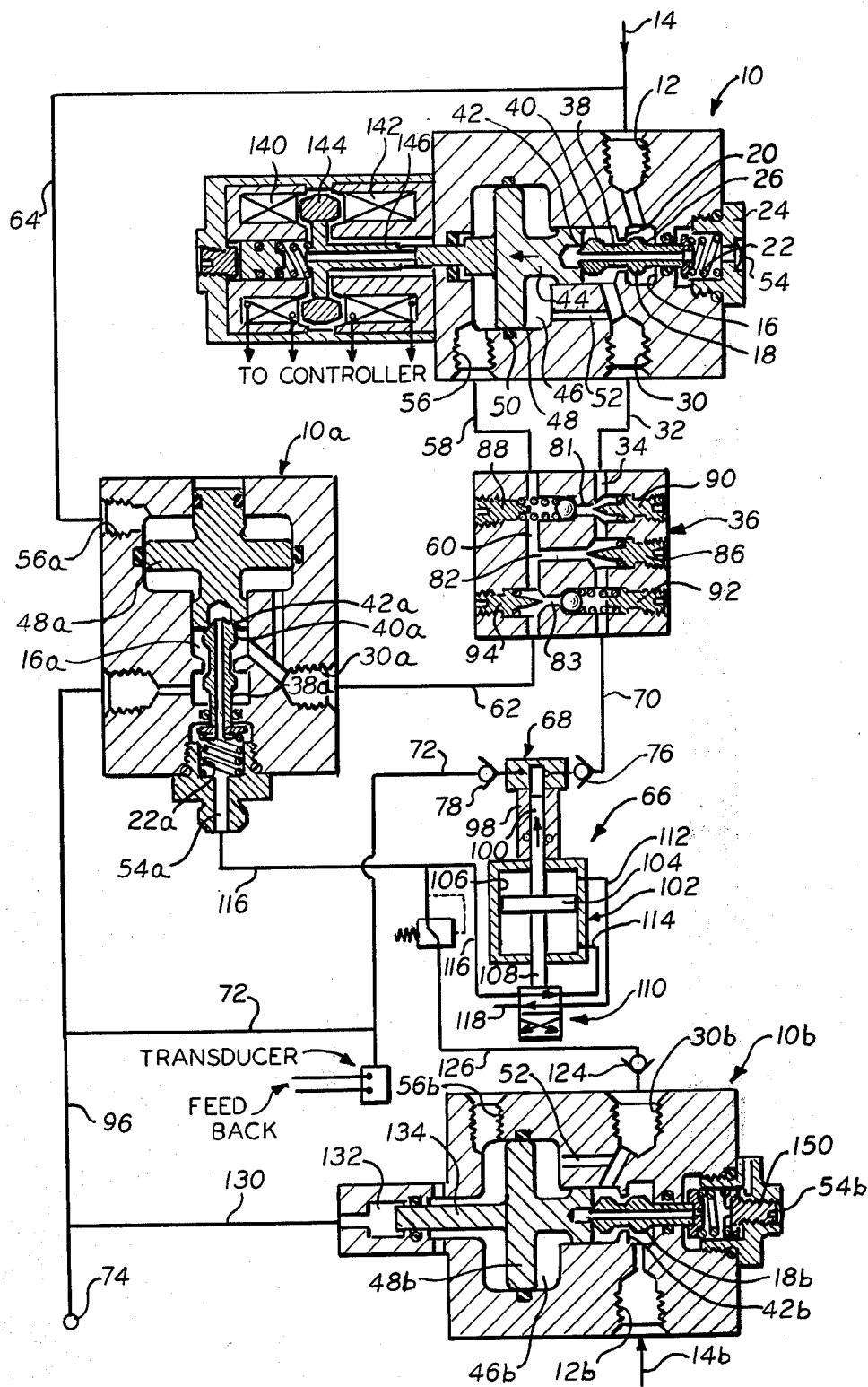
FIG. 1 is a diagrammatic view of a system for controlling pressure in accordance with this invention.

A first flow control valve or regulator 10 has a port 12 to which gas under pressure is supplied from a source 14. The port 12 communicates with a valve chamber 16 in which there is a valve element 18 which is urged against a seat 20 at the left hand end of the chamber 16 by a spring 22. The spring 22 is located in a socket in a threaded cap 24 which screws into the housing of the control valve 10.

The pressure of the spring 22 against the valve 18 can be adjusted by screwing the cap 24 one way or the other in the threads which connect it with the housing of the valve 10. The stem of the valve 18 extends through a wall at the right end of the chamber 16 and this stem, designated by the reference character 26 is sealed around its circumference by an O-ring to prevent leakage of gas from the chamber 16 along the stem 26.

The portion of the chamber 16 beyond the valve seat 20 communicates with a port 30, and when the valve 18 is open fluid flows from the port 12 through the valve chamber 16 and out through the port 30 to tubing 32 that communicates with a passage 34 in a control block 36.

The valve 18 has a stem 38 which extends beyond the valve seat 20 and which carries another valve element 40 that normally contacts with a seat 42 at the end of a piston rod 44.

This piston rod 44 extends into a loading chamber designated by the reference character 46 and there is a piston 48 which forms a movable wall in the loading chamber 46 with a seal 50 which prevents leakage of pressure from one side of the movable wall 48 to the other side. The loading chamber 46 on the right side of the piston or movable wall 48 is always in communication with the port 30 through a connecting passage 52.

The spring 22 holds the valve 40 against the seat 42 whenever the valve 18 is open. As the valve stem 38 moves to the left in FIG. 1, and the valve element 18 contacts with the seat 20, then the spring 22 can no longer exert any force to hold the valve 40 in contact with the seat 42 if there is any movement of the piston rod 44 toward the left. Such further movement of the piston rod 44 toward the left will move the seat 42 away from contact with the valve 40 and vent the portion of the chamber 16 which is to the left of the valve seat 20, and also vent the portion of the chamber 46 which is to the right of the piston 48, and also vent the tubing 32, port 30 and such other passages as are downstream from the port 30, through the hollow interior of the valve stem 38 and out through a port 54 in the cap 24.

The housing of the control valve 10 has another port 56 communicating with the chamber 46 on the right hand side of the piston or movable wall 48. This port 56 is connected by tubing 58 which leads to a passage 60 extending through the control block 36 and communicating at its other end with other tubing 62 that leads to a port 30a of a second control valve 10a which is similar to the control valve 10 in structure but connected in the circuit in a different way.

Because of the fact that the second control valve 10a is of similar construction to the first control valve 10, corresponding parts are indicated by the same reference character with a letter "a" appended and it is not necessary to repeat the description of the structure of the valve 10a.

The loading chamber port 56a is connected by tubing 64 with the port 12 of the first control valve 10 and with the source of gas 14 so that the pressure at the port 56a of the valve 10a is at all times the same as the pressure at the inlet port 12 of the first control valve 10. Thus the loading pressure on the upper side of the piston 48a is always equal to the pressure of the gas supplied from the source 14. This makes the loading of the valve 10a responsive to the supply pressure available to the first control valve 10; and the valve 10a senses any reduction in pressure below that necessary to supply gas under pressure to the test port without use of the pressure intensifier. The second control valve 10a is referred to as the "mode selector" valve since it determines when operation of the pressure intensifier is necessary.

The pressure intensifier is designated generally by the reference character 66 and it includes a pump 68 with supply tubing 70 connected with the passage 34 at the end of that passage opposite to the tubing 32. The pump 68 has its discharge outlet connected with tubing 72 which leads to other tubing that connects with a test port 74 to which the gauges are connected for testing. There are check valves 76 and 78 on the inlet and outlet sides respectively of the pump 68.

Within the control block 36, there are three passages 81, 82 and 83 through which the longitudinal passages 34 and 36 communicate with one another within the block 36.

The middle passage 82 is always open but is throttled by a needle valve 86 which can be adjusted to control the rate of flow through the passage 82.

Passage 81 contains a check valve for preventing flow from the passage 60 to the passage 34 and this check valve is loaded by a spring so that pressure cannot flow from the passage 34 to the passage 60 through the communicating passage 81 unless the pressure is sufficient to open the check valve against the pressure of its spring; and the adjustment of the spring force is effected by a threaded plug 88 in the side of the block 36. Even when there is sufficient pressure to open the check valve in the passage 81, the rate of flow is throttled by a needle valve 90 which is adjustable in the same way as the needle valve 86.

The passage 83 also contains a check valve which operates in the opposite direction of that in the passage 81. No flow from the passage 34 to the passage 36 can take place in the direction of the passage 60 because of this check valve; but gas can flow from the passage 60 toward the passage 34 if the pressure is sufficient to open the check valve in the passage 83 against the force of its spring which is adjusted by a threaded plug 92 in another wall of the block 36. There is also a needle valve 94 threaded through one side of the block 36 in position to throttle flow from the passage 60 into the passage 83.

The circuit for flow of gas from the source of gas 14 to the test port 74 is through the first control valve or regulator 10 and through the tubing 32, passage 34 and tubing 70 to the pressure intensifier pump 68. If no intensifying of pressure is necessary, the supply fluid flows through the check valves 76 and 78 and through the tubing 72 to other tubing 96 which connects directly with the test port 74.

The pump 68 has a cylinder 98 and a piston 100 which reciprocates in the cylinder 98 when the pump 68 is in operation. The pump 68 is operated by a cylinder-and-piston motor designated by the reference character 102. This motor 102 contains a piston 104 which reciprocates in a cylinder 106. The piston 104 has piston rods extending from both sides. One of the piston rods is the piston 100 of the motor 68 and the other piston rod, designated by the reference character 108, connects the piston 104 with a valve 110 which is moved between different positions by movement of the piston 104. The connection of this valve 110 to the piston rod 108 is shown diagrammatically in FIG. 1 and it is actually connected with the piston rod 108 by a lost motion connection so that the valve 110 moves in one direction or the other in response to arrival of the piston 104 at one end or the other of its stroke. Such valve actuators are well known and no detailed illustration of the construction appears necessary for a complete understanding of this invention.

There is tubing 112 connecting the upper end of the cylinder 106 with the valve 110. There is other tubing 114 connecting the lower end of the cylinder 106 with the valve 110. These respective tubings 112 and 114 communicate with the housing of the valve 110. Other tubing 116 and 118 connects with the other side of the valve 110.

When the pressure from the gas supply 14 drops below a predetermined value, the combined force of the pressure from the tubing 62 exerted against the underside of the piston 48a and the force of the spring 22a is sufficient to move the valve seat 42a away from the valve 40a so that gas in the upper part of the chamber 16a flows through the center opening in the valve stem 38a and out through the port 54a and through the tubing 116 to the valve 110. The normal or recycled position of the motor 102 is with the piston 104 near the bottom end of its stroke. Thus when gas under pressure begins to flow through the tubing 116, the valve 110 is in position to admit working fluid through the tubing 114 into the lower end of the cylinder 102. At the same time the tubing 112 is connected with the tubing 118 which is the exhaust from the motor 102.

When the piston 104 reaches the upper end of its stroke, the piston rod 108 moves the valve 110 into the position indicated by the lower half of the block diagram so that the passages in the valve connect the tubing 116 with the tubing 112 leading to the upper end of the cylinder 102; and connect the exhaust line 118 with the tubing 114 leading from the lower end of the piston 102. The piston 104 then travels downward and when it reaches the lower end of its stroke the valve 110 is again shifted into its original position.

Because of the large area of the piston 104 and the small area of the piston 100, a comparatively low pressure exerted under the piston 104 will compress the gas in the cylinder 98 to a very substantial pressure. If the piston 100 raises the pressure in the cylinder 98 to the desired pressure for the test port, the motor 102 stalls because the pressure supplied by the control valves to the tubing 116 is regulated so that the motor will stall when it reaches the intended pressure in the tubing 72 which is desired at the test port 74.

A third control valve indicated by the reference character 10b controls the return stroke for recycling of the pressure intensifier; that is, it brings the pressure intensifier pump 68 back into position for a new stroke when needed. This third control valve 10b is similar in construction to the valves 10 and 10a and corresponding parts are indicated by the same reference characters with a letter "b" appended. The control valve 10b has an inlet port 12b through which relatively low pressure gas is supplied from a source indicated by the reference character 14b. Gas which flows past the valve element 18b, and over the seat 42b, flow to the outlet port 30b; and gas also flows through connecting chamber 52 to exert pressure against the right hand side of the piston 48b in the loading chamber 46b. Acting as an ordinary pressure regulator, the control valve 10b supplies gas at contant and reduced pressure through the outlet port 30b and through a check valve 124 to tubing 126 which communicates with the tubing 116 leading to the pressure intensifier motor control valve 110.

The pressure intensifier motor 102 requires more gas flow during the return and recycle operation than can be provided by the control valve 10a. The control valve 10b provides this additional flow. The output or delivery pressure of the valve 10b is reference to the test circuit pressure through tubing 130 which connects the tubing 96 with a special loading chamber 132 that loads the area of a special piston 134 connected to and extending from the piston 48b into the chamber 132 which is sealed from the left hand side of the loading chamber 46b.

The preferred embodiment of the invention operates with a 70 to 1 ratio of the area of piston 104 to piston 100; and the pressure intensifier is not used below a test circuit pressure of 800 psi. This creates a minimum of 10 psi to recycle the drive piston 100 of the pressure intensifier.

The control valve or regulator 10b is biased so as to supply pressure which is just below that required to increase the pressure in the test circuit. Thus the delivery pressure to the tubing 126 from the control valve 10b is not enough to operate the piston 104 on an upward stroke against the force of the pressure against the piston 100 when there is no pressure supplied from the control valve 10a. However, the pressure required to operate the piston 104 on a downward stroke where the pump piston 100 is not operating against a load, is much smaller and thus the pressure supplied by the third control valve 10b brings the piston 104 back on return strokes at substantially higher velocity than could be obtained with the rate of flow which can be supplied by the control valve 10a.

The test pressure for which the system is adjusted is maintained by a transducer, shown in FIG. 1, connected with the test line tubing 72, which controls a feedback to a comparator circuit (not shown). A controller regulates the pressure in response to a zero to 5 volt direct current input signal which in turn controls the main flow regulator 10. The comparator circuit and feedback connections are not illustrated since such electronic control mechanism is well known and illustration and description of it are not necessary for a complete understanding of this invention.

It is sufficient to understand that the signals from the controller operate two solenoids 140 and 142 connected with the housing of the main control valve 10. An armature 144 located between the solenoid 140 and 142 is connected with an extension 146 leading from the piston 48.

When the solenoid 142 is energized, it attracts the armature 144 with a force dependent upon the current supplied to the solenoid 142 and this changes the loading on the piston 148 so as to change the delivery pressure of the control valve or pressure regulator 10.

Figure 2:
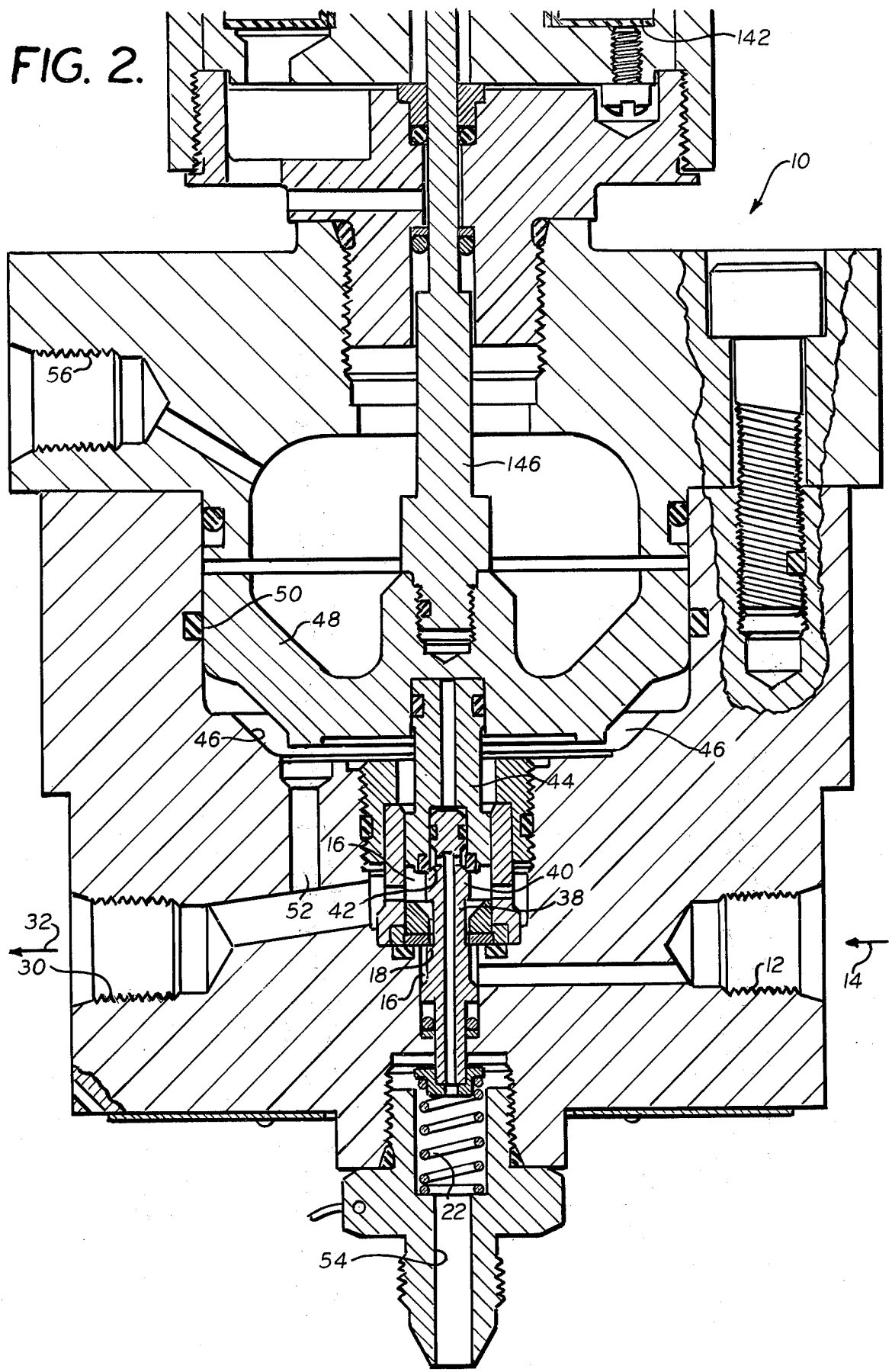
FIG. 2 is a sectional view through one of the control valves shown in FIG. 1, all of the control valves being preferably of similar construction.

When the other solenoid 140 is energized, instead of the solenoid 142, the armature 144 is pulled toward the left in FIG. 2 and this pulling force increases with the amount of current supplied to the solenoid 140 until the valve seat 42 moves away from the valve 40 and permits some of the pressure in the chamber 46, on the right hand side of the piston 48, to vent through the center opening in the valve stem 38 and through the outlet port 54. This not only vents the chamber 46, on the right hand side of the piston 48 but it also vents the control block and the tubing 62 and the passages 34 and 60. It will also vent the test pressure line 96 by back flow through the pressure control valve 10a.

For low flow rates, the center passage 82 in the control block 36 is used. For high flows, the appropriate ball spring bypass opens and allows higher flow rates for rapid pressure changes in either direction. Each of these ball spring bypasses is adjustable for orifice size and pressure by adjusting the springs loading the balls and by adjusting the orifice size by means of the needle valves 90 and 92.

FIG. 2 is a sectional view through the first control valve or pressure regulator 10 which is shown diagramatically in FIG. 1. The parts are indicated in FIG. 2 by the same reference characters as in FIG. 1 since they represent the same parts that are shown diagrammatically in FIG. 1. The extension 146 which carries the armature that is located between the solenoids is shown in FIG. 3 but the solenoids and armature are not shown since they seem to be adequately illustrated in FIG. 1.

The only differences in the control valves 10a and 10b as compared with the structure of the valve 10 shown in FIG. 2, is that the ports leading into and out of the valve housing are differently connected in the different control valves. In the case of the valve 10b, some of the ports are not used. For example, the port 56b has no tubing connected with it and it opens into the ambient atmosphere since a different arrangement for loading this valve is used as shown in FIG. 1. Also the vent port 54b is closed off by a plug 150.

The preferred embodiment of the invention has been illustrated and described, but changes and modifications can be made and some features can be used in different combinations without departing from the invention as defined in the claims.

What is claimed is:

1. A pressure supply system for supplying adjustable and controlled outlet pressure selectively lower or higher than a gas supply pressure, including in combination a first pressure regulator connected on its upstream side to a supply source for gas under pressure, a port on the downstream side of the first pressure regulator from which gas under controlled and reduced pressure is supplied to the system, a first passage connected with said port of the first regulator for connection with an ultimate delivery outlet, a pressure intentsifier pump connected at an intermediate location along the course of said first passage, an activator for operating the pressure intensifier pump to increase the delivery pressure from said first passage to the ultimate delivery outlet when the pressure necessary at the ultimate delivery outlet is in excess of the delivery pressure of the first regulator, a controller that operates the actuator, a connection between the first regulator and the controller for making the controller responsive to the pressure at the first pressure regulator, a second pressure regulator with an upstream port for connection with a source of intermediate pressure fluid, and means connected with the downstream side of the second pressure regulator for restoring the pressure intensifier pump actuator to position for a successive operation when the actuator has been operated by said controller through a stroke that intensifies the pressure delivered to the ultimate delivery outlet.

2. The pressure supply system described in claim 1 characterized by connecting means, between the activator and the pressure intensifier pump, that provide a large mechanical advantage for the activator, whereby the activator can operate the pump with the working fluid pressure supplied to the actuator substantially lower than the delivery pressure against which the pump delivers gas to the ultimate delivery outlet.

3. The pressure supply system described in claim 2 characterized by the activator including a cylinder-and-piston motor, and the pressure intensifier pump being a cylinder-and-piston pump, the cylinder of the activator being of substantially larger diameter than that of the pump to provide a mechanical advantage.

4. The pressure supply system described in claim 3 characterized by the activator piston and the pressure intensifier pump piston having areas related to one another by a ratio of approximately 70:1.

5. The pressure supply system described in claim 3 characterized by an automatic valve connected with the activator and which controls working fluid to the actuator, said valve being movable in response to movements of the actuator piston for reversing the direction of movement of the motor and pump at either end of the motor stroke.

6. The pressure supply system described in claim 3 characterized by the second regulator having connections to the actuator motor for supplying working fluid to the motor to operate the motor in the direction that moves the pump on its suction stroke, and an additional working fluid supply device that supplies working fluid at lower pressure than the second regulator for operating the activator motor in a direction to move the pump on its delivery stroke.

7. The pressure supply system described in claim 2 characterized by the controller including apparatus responsive to decrease in the pressure at the first regulator for starting operation of the actuator and the pressure intensifier.

8. The pressure supply system described in claim 7 characterized by said apparatus responsive to decrease in the pressure at the first regulator also having means responsive to the pressure at the ultimate delivery outlet, and a regulating device that is adjustable to respond to different ratios of ultimate delivery outlet pressure to the pressure supplied by the first regulator.

9. The pressure supply system described in claim 7 characterized by the apparatus responsive to decrease in pressure at the first regulator including valve means operably connected with a loading element comprising a movable wall, chambers on both sides of the movable wall, the first chamber connected to the gas supply source of the first pressure regulator, a second passage connecting the other of the chambers with a loading pressure chamber that controls the delivery pressure of the first regulator.

10. The pressure supply system described in claim 9 characterized by a first bleed connection between said first passage that leads from the downstream port of the first regulator to the ultimate outlet and to said second passage.

11. The pressure supply system described in claim 10 characterized by an adjustable needle valve located in position to control the flow of gas through the first bleed connection.

12. The pressure supply system described in claim 10 characterized by two other bleed connections in parallel with said bleed bleed connection, one of said other bleed connections having a loaded check valve therein for preventing flow in one direction and permitting flow in the other direction when pressure across the check valve is sufficient to overcome the loading thereof, and the second of said other bleed connections having a loaded check valve therein oriented in the opposite direction from the first check valve.

13. The pressure supply system described in claim 1 characterized by adjustable means for loading the first regulator to control its delivery pressure at said downstream port, and means for sensing the pressure at the ultimate delivery outlet, the sensing means being connected with the adjustable loading means to change the loading of the first regulator when the supply pressure to the first regulator is as great as the intended pressure at the ultimate delivery port.

14. The pressure supply system described in claim 13 characterized by the means for sensing the pressure at the ultimate delivery outlet being a transducer, and the adjustable loading means being an electromagnetic device that supplies a pressure in proportion to the power supplied to the electromechanical device.

15. The pressure supply system described in claim 14 characterized by the electromagnetic device having elements that make it a double-acting apparatus that moves a part of the first regulator to adjust the delivery pressure when the electromagnetic device moves in one direction and that moves parts of the first regulator to vent the downstream side of the first regulator and the passages connected therewith when the electromagnetic device moves in another direction.

16. The pressure supply system described in claim 1 characterized by at least one of the pressure regulators having a poppet valve controlling flow of gas through the regulator, and a loading device that closes the valve when necessary to maintain substantially constant pressure at the delivery outlet, the loading device being movable further, when the poppet valve closes, and a vent passage which is opened by the further movement of the regulator loading means.

* * * * *